United States Patent
Hiebl et al.

(10) Patent No.: US 9,837,859 B2
(45) Date of Patent: Dec. 5, 2017

(54) WIRELESS REMOTE ENERGY SUPPLY FOR UNMANNED AERIAL VEHICLES

(71) Applicant: EADS DEUTSCHLAND GMBH, Ottobrunn (DE)

(72) Inventors: Manfred Hiebl, Neuburg a. d. Donau (DE); Hans Wolfgang Pongratz, Taufkirchen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 135 days.

(21) Appl. No.: 14/649,911

(22) PCT Filed: Dec. 2, 2013

(86) PCT No.: PCT/DE2013/000713
§ 371 (c)(1),
(2) Date: Jun. 4, 2015

(87) PCT Pub. No.: WO2014/086330
PCT Pub. Date: Jun. 12, 2014

(65) Prior Publication Data
US 2015/0311755 A1    Oct. 29, 2015

(30) Foreign Application Priority Data
Dec. 5, 2012    (DE) .......................... 10 2012 023 719

(51) Int. Cl.
*H02J 17/00* (2006.01)
*G02B 19/00* (2006.01)
(Continued)

(52) U.S. Cl.
CPC .......... *H02J 17/00* (2013.01); *G02B 19/0085* (2013.01); *H02J 7/025* (2013.01); *H02J 50/30* (2016.02); *H04B 10/807* (2013.01)

(58) Field of Classification Search
CPC ...... G02B 19/0085; H02J 17/00; H02J 50/30; H02J 7/025; H04B 10/807
See application file for complete search history.

(56) References Cited

U.S. PATENT DOCUMENTS

| 5,260,639 A | 11/1993 | De Young et al. |
| 6,364,253 B1 | 4/2002 | Cavanagh |

(Continued)

FOREIGN PATENT DOCUMENTS

| CN | 102664469 A | 9/2012 |
| DE | 10 2004 055 498 A1 | 3/2006 |

(Continued)

OTHER PUBLICATIONS

International Search Report (PCT/ISA/210) dated Sep. 23, 2014, with English translation (eleven (11) pages).

(Continued)

*Primary Examiner* — Francis M Legasse, Jr.
(74) *Attorney, Agent, or Firm* — Crowell & Moring LLP

(57) ABSTRACT

A transmitter unit for wireless transmission of power by way of a bundled laser beam is described. The transmitter unit has a laser fiber bundle having a plurality of laser fibers, wherein each laser fiber is designed to emit a laser beam; positioning optics for adjusting an emission direction of the bundled laser beam; a field lens and a primary lens. The plurality of laser fibers is designed to emit a laser beam from each, passing through the positioning optics, the collimator lens and the primary lens, in this order, so that the laser beam emitted by the transmitter unit is emitted in bundled form. A particularly efficient device with an unlimited flight time and a large radius of use is achieved by the hybrid drive with solar power and laser power from the ground and temporary storage of the power in batteries.

18 Claims, 4 Drawing Sheets

(51) Int. Cl.
  *H02J 7/02*     (2016.01)
  *H04B 10/80*    (2013.01)
  *H02J 50/30*    (2016.01)

(56)              References Cited

U.S. PATENT DOCUMENTS 6,407,535  B1   6/2002   Friedman et al.
  6,934,014  B1   8/2005   Kleinhuber
  7,970,040  B1   6/2011   Sprangle et al.
  2002/0046763 A1   4/2002   Berrios et al.
  2003/0206350 A1   11/2003  Byren et al.
  2005/0190427 A1*  9/2005   Steinsiek .............. B64G 1/428
                                              359/237
  2005/0242185 A1* 11/2005  Winkler ............... G03B 21/005
                                              235/454
  2010/0238680 A1   9/2010   Stuart
  2012/0203450 A1   8/2012   Meyer et al.

FOREIGN PATENT DOCUMENTS

DE    10 2011 010 679 A1    8/2012
  EP          1 469 617 A2   10/2004
  EP          1 566 902 A1    8/2005
  JP           2008-245404 A  10/2008
  WO    WO 2008/097669 A1     8/2008
  WO    WO 2009/083990 A2     7/2009
  WO    WO 2011/117619 A2     9/2011

OTHER PUBLICATIONS

German-language Written Opinion (PCT/ISA/237) dated Sep. 23, 2014 (seven (7) pages).
Chinese Office Action issued in Chinese counterpart application No. 201380063641.5 dated Jul. 3, 2017 (Eight (8) pages).

\* cited by examiner

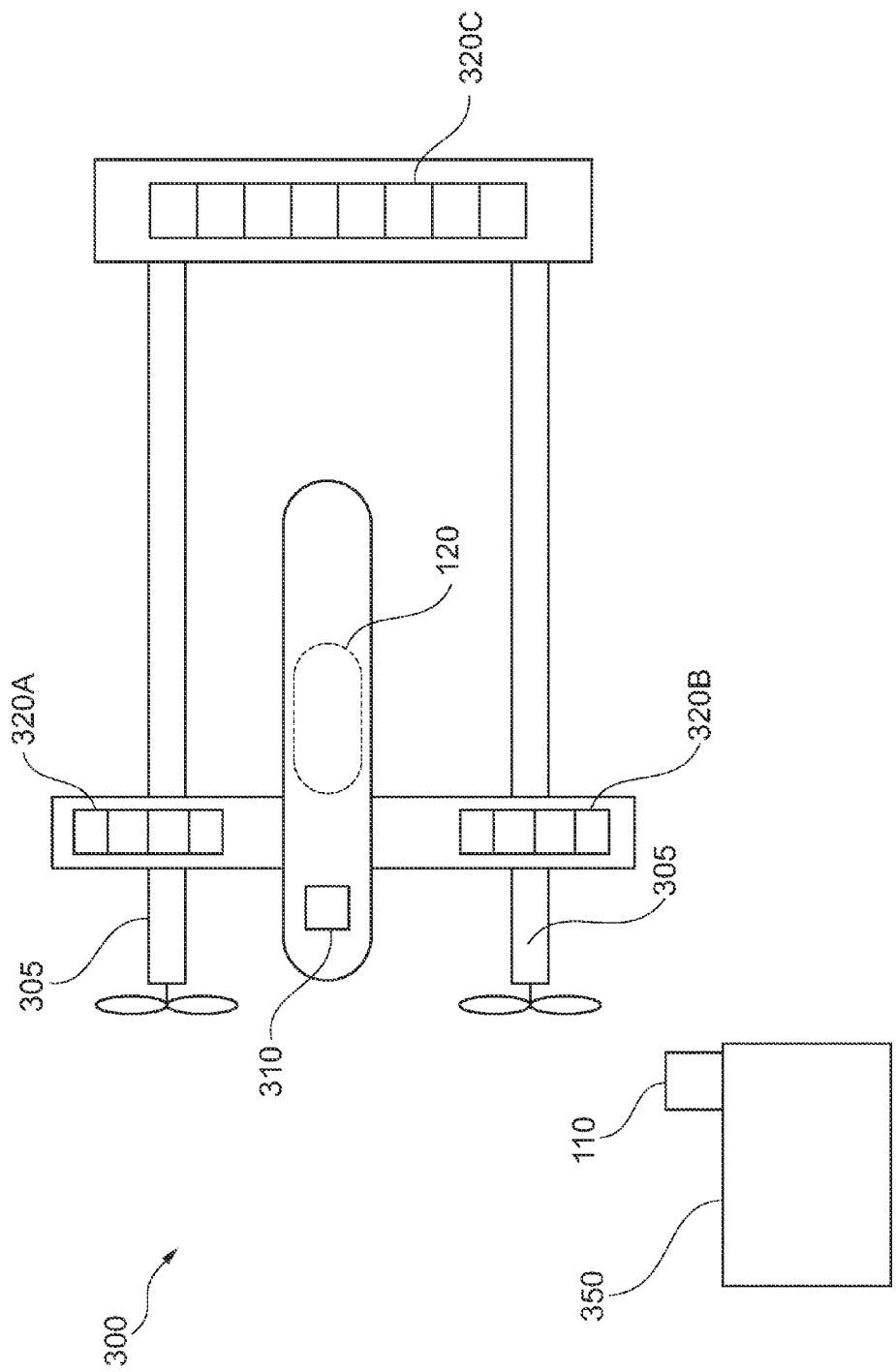

WIRELESS REMOTE ENERGY SUPPLY FOR UNMANNED AERIAL VEHICLES

FIELD OF THE INVENTION

The invention relates to a device for wireless electric remote power supply of small unmanned aircraft, in particular for distances up to approximately 10 km, starting from a stationary or mobile ground station or from a flying station using high-power lasers. The invention relates, in particular, to a transmitter unit for wireless transmission of power by way of a bundled laser beam, as well as an aircraft with a receiver unit for receiving the bundled laser beam emitted by the transmitter unit.

BACKGROUND OF THE INVENTION

Unmanned, electrically driven small aircraft with typical weights of approximately 10 kg or less are being used for monitoring and information in the lower altitude range of approximately 5 km to 10 km flying altitude. When such small aircraft are used, the goal may be, for example, to maximize the use time and/or flight time and to impart a speed and stability to the aircraft that will make it possible to maneuver them freely for most of the flight time and/or use time against prevailing winds and turbulence in the atmosphere and even rain. The aircraft must therefore have adequate mechanical strength, a sufficiently high surface load and a sufficiently high driving power. These requirements can result in an increase in the weight of the aircraft, such that power obtained from regenerative power sources on board the aircraft may not be sufficient under some circumstances to operate such an aircraft over a period of time of several days, for example, without interruption, i.e., to keep it in the air. Providing power storage devices in the form of batteries can run counter to this goal under some circumstances because such power storage devices bring a certain amount of inherent weight, so they may further increase the total weight of the aircraft, which can in turn increase the power demand.

DE 10 2011 010 679 A1 describes a design and a control system of an unmanned aircraft, in which power is supplied to drive the aircraft by on-board power storage devices.

SUMMARY OF THE INVENTION

The object of the invention may be regarded as increasing the maximum operating time of transport device.

A transmitter unit for wireless transmission of power (energy) by way of a bundled laser beam and a transport device having a receiver unit for receiving a bundled laser beam emitted by such a transmitter unit are defined in accordance with the invention.

According to a first aspect, a transmitter unit for wireless transmission of power by way of a bundled laser beam is described, wherein the transmitter unit is a laser fiber bundle having a plurality of laser fibers, wherein each laser fiber is designed to emit a laser beam, a positioning optics system for adjusting the direction of emission of the bundled laser beam, a collimator lens and a primary lens. Most of the laser fibers are designed so that each fiber emits a laser beam that passes through the positioning optics, the collimator lens and the primary lens, so that the laser beam emitted by the transmitter unit is emitted in bundled form.

In one embodiment, the transmitter unit may be designed in particular so that each laser beam passes through the positioning optics, the collimator lens and the primary lens, in this order.

Due to this design of the transmitter unit and due to this arrangement of the positioning optics, the collimator lens and the primary lens, it is possible to supply a bundled laser beam, wherein the bundled laser beam strikes a minimum area of a receiver unit at a distance of up to 10 km, for example, and/or strikes a minimum extent of this receiving area. In other words, the given design of the transmitter unit is precisely what makes it possible for the bundled laser beam supplied by the transmitter unit to have a high power density per unit of area bombarded, even at great distances of several kilometers, for example, 10 km.

In one embodiment, the laser fiber bundle may have seven laser fibers, for example, wherein the laser beams of all the laser fibers are passed through a common field lens, which is arranged near the laser fiber aperture and images all the light emitted from the laser fibers on the primary lens and thus the laser beams of all the laser fibers are combined into a single bundled laser beam by the field lens and the primary lens, and this laser beam is sharply focused on the laser receiver and imaged at a great distance.

According to one embodiment, the transmitter unit has at least one Cardan suspension, which is pivotable about two mutually orthogonal axes for accommodating at least one element from the group of optical elements consisting of the laser fiber bundle, the positioning optics, the field lens and the primary lens.

A line-of-sight stabilization unit, consisting of a laser gyroscope-supported GPS system and servo drives for the two Cardan axes may be arranged on the Cardan frame, so that the line of sight is correctly aligned with the receiver at low movement frequencies of less than 10 Hz. Precision stabilization of the line of sight against high-frequency disturbances of up to 100 Hz with a very small amplitude of milliradians to microradians is accomplished by a pivotable thick glass plate with a piezoelectric drive directly in front of the image field-leveling optics, which is formed by a coaxially designed camera that can supply up to 500 images per second and tracks a retroreflector on the laser receiver and adjusts the glass plate by means of a corresponding control unit, so that the line of sight is always aimed exactly at the retroreflector with an accuracy of at least 50 microradians.

The stabilized Cardan suspension and the precision stabilization permit accurate positioning and alignment of the transmitter unit as well as the bundled laser beam, which is necessary because of the long transmission distance of the bundled laser beam.

According to another embodiment, the transmitter unit has image field-leveling optics arranged between the field lens and the primary optics. This makes possible a smaller focal spot on the receiver due to a better optical correction, and thus permits a smaller lighter receiver.

The image field-leveling and correction optics make it possible to supply a homogeneous bundled focused laser beam at the receiver with diffraction-limited diameter and thereby reduces or eliminates power losses by reducing the scattering losses due to scattered or deflected laser beams.

According to another embodiment, the transmitter unit has a plurality of deflecting mirrors and at least one lens group for lengthening the focal distance in the second beam path, which can be pivoted into the beam path as needed and are arranged with the image field-leveling optics between the field lens and the primary lens, so that the transmitter unit has a folded beam path with a lengthened focal distance as needed.

Due to the use of deflecting mirrors and the fact that a lengthened focal distance is supplied, an altered transmission distance can be achieved for the power to be transmitted and taken into account.

According to another embodiment, the transmitter unit has a monitoring unit, which is designed to monitor a monitoring region in the direction of emission of the bundled laser beam in front of the transmitter unit, wherein the monitoring unit is designed to interrupt the transmission of the bundled laser beam by the transmitter unit when an object penetrates into the monitoring region.

The monitoring unit is thus a mechanism and/or a device, which can increase the operational reliability of a transmitter unit, as described above and below. In particular the monitoring unit may be designed to detect the penetration of aircraft or birds, for example, into the monitoring region.

According to another embodiment, the monitoring unit has a close-range monitoring region and a wide-range monitoring unit.

The close-range monitoring unit and the wide-range monitoring unit differ in the design of their detection devices, each of which can be adjusted to the distances assigned to them.

According to another aspect, a transport device having a receiver unit for receiving a bundled laser beam, which was emitted by a transmitter unit, as described above and below, is described. The receiver unit has a radiant power capture unit, which is designed to receive the bundled laser beam emitted by the transmitter unit and convert it into electricity, wherein the electricity is provided for supplying electricity to a drive of the transport device.

The transport device can thus be enabled to achieve an operating time and/or a use time, which does not depend on the presence of on-board stored power because the power required for the drive is obtained by the receiver unit from the bundled laser beam emitted by the transmitter unit.

According to one embodiment, the receiver unit has a retroreflector, which is designed to reflect a small portion of the laser power of the transmitter from the receiver as a positioning beam back in the direction of the transmitter unit, wherein the positioning beam is designed to perform a highly precise alignment of the transmitter unit in the direction of the receiver unit with the help of the precision stabilization unit, so that the bundled laser beam is emitted onto a predefined receiving area of the receiver unit.

In other words, the reflector thus serves for alignment and/or tracking of the transmitter unit along the line of movement of the transport device, so that the high-power laser beam emitted by the transmitter unit always strikes the receiving area of the receiver unit. The transmitter unit is therefore designed to emit a portion of the high-power beam to the retroreflector mounted at the center of the receiver, wherein tracking and/or alignment of the transmitter unit with the receiver is made possible by the reflection of the positioning beam on the reflector.

According to another embodiment, the receiving area for receiving the bundled laser beam is in the form of a circle, is in a Cardan suspension and can thus always be directed at the transmitter and has a diameter of max. 0.5 m, which can still be carried well by a small aircraft in an aerodynamically clad shell.

In one embodiment, the diameter of the receiving area may be 0.5 m. In another embodiment, the diameter is less than 0.5 m.

It is thus possible to provide a receiver unit having small dimensions, so that the receiver unit can be used in conjunction with a transport device of small dimensions and, in particular, a small aircraft. The use of a small receiving area of the given extent, for example, requires a highly precise aiming of the receiver unit and of the transmitter unit, so that the bundled laser beam emitted by the transmitter unit is, first, focused precisely on the receiver as a real image and, second, can be directed at the receiver unit with a high precision.

According to an additional embodiment, the transport device has a transparent hydrodynamic housing to accommodate the receiver unit, wherein the receiver unit is in a Cardan suspension in the housing.

In a manner similar to that with the transmitter unit, the Cardan suspension of the receiver unit in the housing allows good stabilization and orientation of the receiver unit for reception of the bundled laser beam.

The receiver unit may be a solar generator, which is arranged in a housing that is itself arranged as a closed, droplet-shaped protective shell consisting of a transparent film with a laminar profile on its exterior surface.

If the solar generator can always be oriented at a right angle to the line of sight, i.e., to the connecting line between the transmitter unit and the receiver unit, then three-layer solar cells may be used with concentrator optics having an efficiency twice as high as that of normal single-layer solar cells.

According to another embodiment, for stabilization, the housing can be acted upon with an excess pressure in comparison with atmospheric pressure prevailing outside of the housing.

This makes it possible for the housing to retain a predefined shape with a very small wall thickness and a low weight, so that a bundled laser beam passing through the housing wall is not deflected in an unpredictable and unwanted manner.

According to another embodiment, the transport device has a rechargeable battery, which is designed to be charged by way of the power received by the receiver unit, wherein the battery is designed to supply electricity to be supplied to the drive for the transport device when the power supplied by the laser receiver unit drops below a predefined level.

According to another embodiment, the transport device is assembled with solar cells on its top side. These solar cells are capable of supplying a significant portion of the operating power when there is sufficient sunlight and can even supply power for storage in the batteries during the day. The design with a hybrid drive using solar power and laser power from the ground with temporary storage in the batteries yields a particularly efficient and flexible transport device that can be used to a practically unlimited extent over time and can also undertake long flights outside of the range of the laser power supply range of up to 100 km at night and up to 300 km during the day with the solar power component and battery storage.

The rechargeable battery can thus be utilized in particular for bridging periods of time during which transmission of power by way of the laser beam is subject to a negative influence because of weather, for example, or because of a separation of the optical line of sight between the transmitter unit and the receiver unit, and also when no solar power is available.

According to another embodiment, the transport device is designed as an aircraft and, in particular, as an unmanned aircraft.

According to another aspect, a system for wireless remote power transmission by way of a high-power laser is described, wherein the system has a transmitter unit and a receiver unit, each one as described above and below.

The transmitter unit may be assigned to a stationary facility and the receiver unit may be assigned to a mobile facility, wherein the power is transmitted from the stationary facility to the mobile facility.

The system may have a plurality of stationary facilities, each having one or more transmitter units, wherein the mobile facility may be designed to receive power from the closest local stationary facility. If the mobile facility is an unmanned aircraft, then its flight path can be predetermined or can be implemented from a ground station. The unmanned aircraft and all ground stations may be interconnected by data transmission links to transmit the position and flight data of the unmanned aircraft, for example.

In other words, by way of a bundled laser beam through a transmitter unit with high-precision aiming, by use of a mirror telescope with a long focal distance and a collimator device, and a system of a plurality of cascaded high-performance diode lasers with output of the laser radiation into the shared collimator through light guide fibers in the plane of the image of the mirror telescope, and by imaging of the laser fiber-end image plane on the receiver solar generator of the aircraft, there can be a transmission of power at a distance of 5 to 10 km from the transmitter unit, for example. The number of high-performance diode lasers can vary as a function of the required amount of power. In one embodiment, seven cascaded high-performance diode lasers with 4.2 kilowatts of light power together are supplied. Their laser radiation is output to the collimator by light guide fibers with a thickness of 200 micrometers.

To permit an accurate orientation of the transmitter unit at great distance, the line of sight of the primary lens must be stabilized with a high precision, for example, at 50 microradians. The primary lens may be a mirror telescope, for example. The mirror telescope is stabilized in the first step by supporting the mount of the mirror telescope on a vibration-isolated and angle-stabilized platform. In the second step, the mount of the mirror telescope pivots the mirror telescope about two axes according to angles from a GPS-INS system, which is arranged on the platform and orients the telescope line of sight with the reflector on the receiver unit. This may be accomplished with the help of a guidance mechanism, for example, that tracks the reflector. In addition, minor high-frequency disturbances in the line of sight that cannot be regulated out by the mounting due to the inertia of the mirror telescope, can be regulated out by a precision stabilization unit in the beam path of the laser beam, so that the line of sight remains directed at the reflector with an accuracy of 50 microradians.

The receiver solar generator of the receiver unit is mounted in an angle-stabilized mount that allows pivoting in two axes and can align the solar generator with the transmitter unit with an accuracy of one degree.

The solar generator can be constructed of a mosaic of solar cells, for example, with a diameter of 0.5 m. The solar generator may also have a larger or a smaller diameter, wherein the diameter and/or the dimensions of the solar generator may be based on the power demand and the dimensions of the aircraft. The solar cells may be triple junction InGaP—InGaAs—Ge solar cells with an upstream collecting lens as the concentrator by a factor of 100, for example, with integrated cooling of the solar cells.

The laser diodes can transmit, for example, at a transmission wavelength of 0.976 micrometers, and the reception wavelength of the Ge solar cell layer can be adjusted there, so that the Ge solar cell also has its greatest quantum efficiency and therefore has a high efficiency, so that the system as a whole achieves a high overall efficiency for wireless transmission of power by way of a bundled laser beam. In addition, at this wavelength, there is a good atmospheric window, which has up to 60% transmission at a transmission distance of 5 km.

The housing for the receiver unit may be designed so that the receiver solar generator is mounted in a droplet-shaped housing with a laminar profile on its exterior surface, where the housing consists of transparent Mylar film, for example, which can be stabilized by internal pressure and can be mounted on the bottom side of the unmanned aircraft. This makes it possible for the housing to have an unhindered all-round view, i.e., an unhindered visual sight connection between the receiver unit and the transmitter unit.

The transmitter unit and the receiver unit, as described above and below, make it possible in a particularly advantageous manner for small unmanned aircraft weighing 5 to 25 kg, for example, to supply power by day and night at low atmospheric altitudes of 5 km to 10 km, so that the available power is not a limiting parameter for the flight time, i.e., use time of the small aircraft.

The transmitter unit and the receiver unit supply enough power to have reserves for bad weather and useful load sensor operation of the aircraft and to be able to charge batteries on board the aircraft. The aircraft can therefore be insensitive to disturbances and can fly in a flight range outside of the range of the transmitter unit and/or in shaded regions for a limited period of time. The power supply to the aircraft is supplemented during the day when there is sufficient sunlight by solar cells on the top of the aircraft. Therefore, the aircraft can also move far beyond the range of the laser transmitter during the day.

Due to the use of fiber-coupled, cascaded high-performance diode lasers with the transmitter unit described above and below, the laser beam power can be bundled in a very narrow beam with an aperture angle of 0.1 milliradian, for example, to a receiver with a diameter of 0.5 m, for example, at a distance of 5 km, and can be directed at the receiver solar generator by the arrangement of a tracking device with a correcting lens in the telescope beam path and a reflector beneath the receiver solar generator, accurate to 0.01 milliradian. Therefore, a smaller, lighter and more easily installed receiver solar generator, for example, can be used for a small unmanned aircraft.

Due to the right-angle, i.e., perpendicular, alignment of the trackable receiver solar generator with the bundled laser beam, the power transmitted by the bundled laser beam can be maximized.

Exemplary embodiments of the invention are described below with reference to the figures.

BRIEF DESCRIPTION OF THE FIGURES

FIG. 4 shows an aircraft according to an additional exemplary embodiment of the invention.

DETAILED DESCRIPTION OF THE EXEMPLARY EMBODIMENTS

Figure 1:
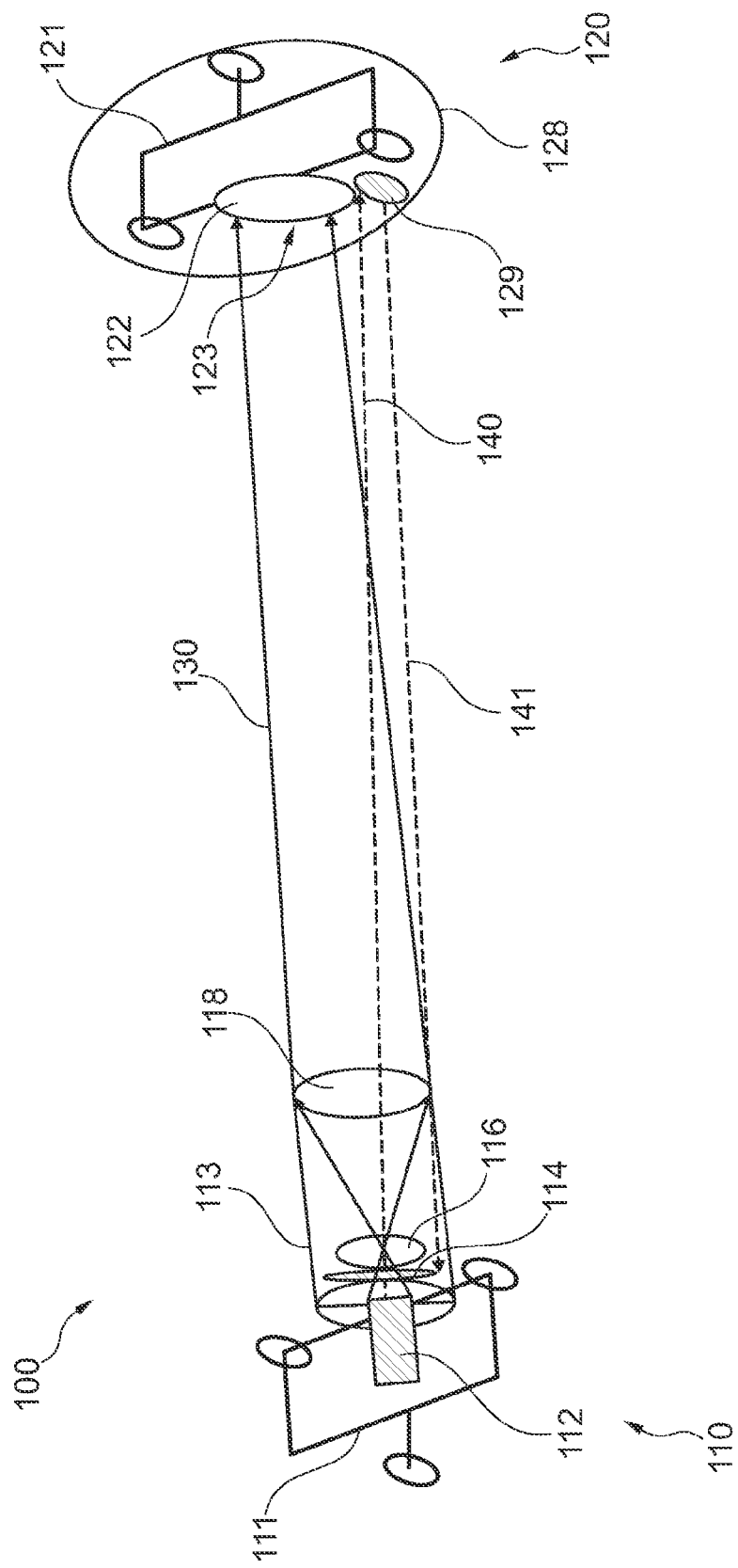
FIG. 1 shows a power transmission unit with a transmitter unit according to one exemplary embodiment of the invention.

The diagrams in the figures are schematic and are not drawn to scale. If the same reference numerals are used in the following description of the figures, these pertain to the same or similar elements.

FIG. 1 shows a power transmission device 100 with a transmitter unit 110 and a receiver unit 120. The transmitter unit has a laser fiber bundle 112, a positioning optics 114, a collimator lens 116 and a telescopic lens 118, wherein these elements are in a Cardan suspension by means of the suspension 111. The positioning optics 114, the collimator lens 116 and the telescopic lens 118 can be combined structurally in the form of a telescope 113.

The transmitter unit 110 is designed to emit a bundled laser beam 130 in the direction of the receiver unit 120. In addition, the transmitter unit is designed to emit a positioning beam 140 in the direction of the receiver unit 120, wherein the positioning beam is reflected by the receiver unit in the form of the acknowledgment beam 141 and serves to align and track the transmitter unit in the direction of the receiver unit.

The receiver unit 120 has a radiant power capture unit 122 in the form of a solar generator, which has a receiving area 123, which the bundled laser beam 130 strikes. The solar generator 122 is designed to convert the bundled laser beam striking the receiving area 123 into electricity.

The receiver unit has a reflector 129, which is designed to reflect the positioning beam 140 in the form of the acknowledgement beam 141 in the direction of the transmitter unit.

The solar generator 122 and the reflector 129 are in a Cardan suspension by way of the suspension 121.

The receiver unit 120 is arranged in the housing 128. The housing 128 is preferably made of a transparent film, which is acted upon by an internal pressure.

Figure 2:
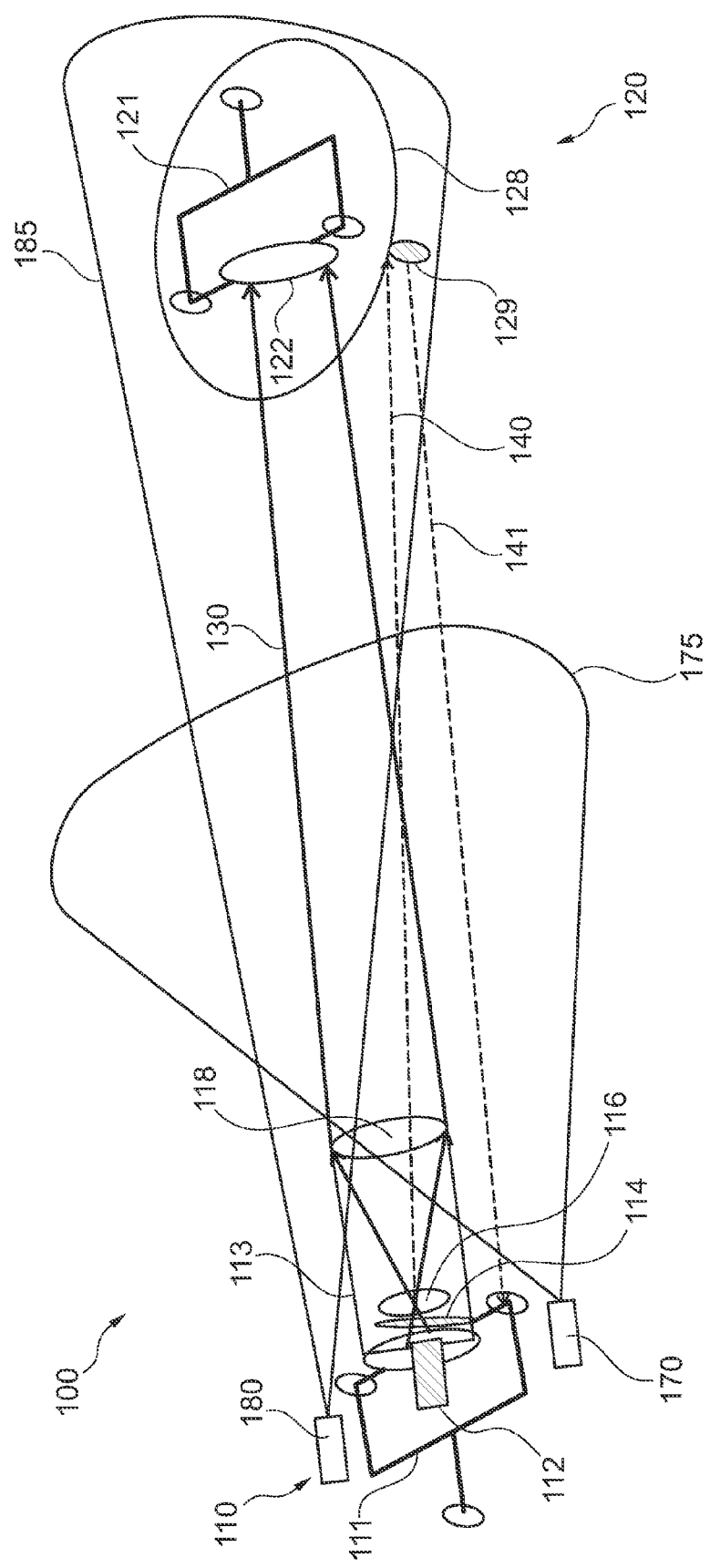
FIG. 2 shows a power transmission unit with a transmitter unit according to one additional embodiment of the invention.

FIG. 2 shows a power transmission device 100 with a transmitter unit 110 and a receiver unit 120 comparable to the diagram in FIG. 1. The transmitter unit 110 shown in FIG. 2 has a close-range monitoring unit 170 and a far-range monitoring unit 180, each of which is designed to monitor a monitoring region 175 and/or 185, which is located in a transmission region of the bundled laser beam 130 between the transmitter unit 110 and the receiver unit 120. As shown clearly in FIG. 2, the monitoring regions 175 and 185 overlap, so that the entire space between the transmitter unit and receiver unit, which is provided for the transmission of the bundled laser beam, is detected by at least one of the monitoring units 170 and 180.

Figure 3:
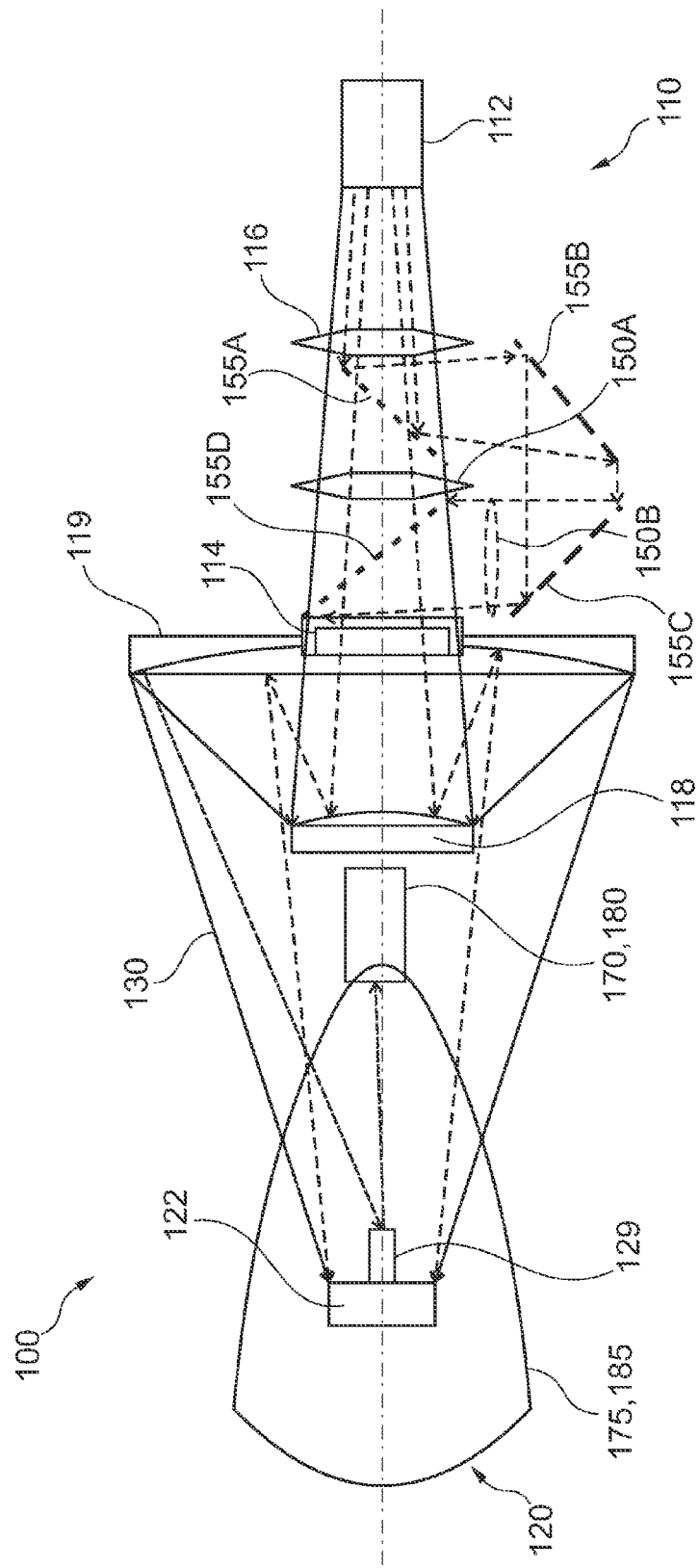
FIG. 3 shows a power transmission unit with a transmitter unit according to an additional exemplary embodiment of the invention.

FIG. 3 shows a power transmission device 100 with a transmitter unit 110 and a receiver unit 120. The transmitter unit 110 has a laser fiber bundle 112, a positioning optics 114, a collimator 116, a telescopic lens 118 and a primary mirror 119. A flat-field lens 150A, 150B is positioned between the collimator lens and the positioning optics. The flat-field lenses 150A, 150B constitute alternative focal distance settings of the optics of the transmitter unit. If a longer focal distance is needed, deflecting mirrors 155A, 155B, 155C, 155D in the optics of the transmitter unit 110 are used, wherein the deflecting mirrors deflect the laser beams of the laser fiber bundle 112 by means of the flat-field lens 150B.

The collimator lens and/or the collimator optics serve(s) to image the laser fibers on the primary mirror and the flat-field lens can prevent a focal spot from forming in the laser beam.

The collimator lens 116 may have a focal distance of 24 mm and a diameter of 5 to 8 mm, in particular 6.8 mm, for example. In one exemplary embodiment, the primary lens may have a diameter of 305 mm and a focal distance of 6 m (for a distance of 5 km between the receiver unit and the transmitter unit) and 12 m (for a distance of 10 km between the receiver unit and the transmitter unit). The positioning optics comprises a device for emitting and orienting optical beams and in particular laser beams.

FIG. 4 shows an aircraft 300, which is driven by two drives 305. The aircraft may be a small unmanned aircraft for information purposes, in particular. For the power supply for the drive units 305, the aircraft 300 has a receiver unit 120, as described above and below, a rechargeable battery 310 and three solar cells 320A, 320B and 320C.

Receiver unit 120 is designed to receive power by way of a bundled laser beam from the transmitter unit 110, wherein the transmitter unit 110 is arranged at a ground station 350.

The aircraft 300 thus combines several power supply sources in the form of a receiver unit, as described above and below, a rechargeable on-board battery and solar cells, wherein both the receiver unit and the solar cells may be designed to supply power to the rechargeable battery, so that the aircraft can be driven by way of power from the rechargeable battery in the event of a failure of or a disturbance in the power supply via the receiver unit or via the solar cells.

In addition to operation of the drive units 305, the receiver unit, the rechargeable battery and the solar cells can supply power for an electronic system on board the aircraft.

The aircraft may be a small unmanned aircraft with a wing span of 3 to 6 meters and in particular 4.5 meters, a wing area of approximately 1.0 m2 and a weight of 8 kg, which corresponds to a wing load of 8 kg per m2. The aircraft may be designed to be operated at a flying speed between 40 and 70 km/h and in particular 60 km/h. Thus, in one exemplary embodiment, up to 200 watts of electricity may be required to drive the aircraft, wherein the transmitter unit is designed for transmitting and/or the receiver unit is designed for receiving a laser beam which strikes the solar generator for generating this required electricity.

In another exemplary embodiment, the solar generator of the receiver unit may be designed to receive up to 2100 watts of optical power and to make available up to 580 watts of electricity according to the efficiency. These performance specifications may relate to a distance of approximately 5 km between the transmitter unit and the receiver unit, so that a large operational radius and/or radius of flight is/are made possible for the aircraft.

LIST OF REFERENCE NUMERALS

100 Power transmission device
110 Transmitter unit
111 Suspension
112 Laser fiber bundle
113 Telescope
114 Positioning optics
116 Field lens
118 Telescopic lens
119 Primary mirror
120 Receiver unit
121 Suspension 122 Radiant power capture unit
123 Receiving area
128 Housing
129 Retroreflector
130 Laser beam
140 Positioning beam
141 Acknowledgment beam
150A Image field-leveling and correction optics
150B Image field-leveling and correction optics
155A Deflecting mirror
155B Deflecting mirror
155C Deflecting mirror
155D Deflecting mirror
170 Close-range monitoring unit
175 Monitoring region
180 Wide-range monitoring unit
185 Monitoring region
300 Aircraft
305 Drive
310 Battery
320A Solar cell
320B Solar cell
320C Solar cell
350 Ground station

The invention claimed is:

1. A transmitter unit for wireless transmission of power by way of a bundled laser beam, comprising:
a laser fiber bundle having a plurality of laser fibers, wherein each laser fiber is designed to emit a laser beam;
a positioning optics for adjusting an emission direction of the bundled laser beam;
a field lens; and
a primary lens,
wherein the plurality of laser fibers is configured to each emit a laser beam, which passes through the positioning optics, the field lens and the primary lens such that the laser beam emitted by the transmitter unit is emitted in bundled form,
wherein the transmitter unit is configured such that each laser beam passes through the positioning optics, then the field lens and then the primary lens, in that order.

2. The transmitter unit according to claim 1, further comprising:
at least one Cardan suspension that accommodates at least one element from the group of optical elements comprising: the laser fiber bundle, the positioning optics, the field lens and the primary lens.

3. The transmitter unit according to claim 1, further comprising:
an image field-leveling and correction optics, which is arranged between the field lens and the positioning optics.

4. The transmitter unit according to claim 1, further comprising:
a monitoring unit which is configured to monitor a monitoring region situated in front of the transmitter unit in a direction of the emission radiation of the bundled laser beam,
wherein the monitoring unit is configured to interrupt a transmission of the bundled laser beam by the transmitter unit when an object penetrates into the monitoring region.

5. The transmitter unit according to claim 2, further comprising:
an image field-leveling and correction optics, which is arranged between the field lens and the positioning optics.

6. The transmitter unit according to claim 3, further comprising:
a plurality of deflecting mirrors and a focal distance-lengthening optics, which are arranged with the image field-leveling and correction optics between the field lens and the primary lens, so that the transmitter unit has a lengthened focal distance.

7. The transmitter unit according to claim 4, wherein the monitoring unit comprises a close-range monitoring unit and a far-range monitoring unit.

8. The transmitter unit according to claim 6, further comprising:
a monitoring unit which is configured to monitor a monitoring region situated in front of the transmitter unit in a direction of the emission radiation of the bundled laser beam,
wherein the monitoring unit is configured to interrupt a transmission of the bundled laser beam by the transmitter unit when an object penetrates into the monitoring region.

9. The transmitter unit according to claim 8, wherein the monitoring unit comprises a close-range monitoring unit and a far-range monitoring unit.

10. A transport device, comprising:
a receiver unit configured to receive a bundled laser beam, which has been emitted by a transmitter unit, the transmitter unit comprising:
a laser fiber bundle having a plurality of laser fibers, wherein each laser fiber is designed to emit a laser beam;
a positioning optics for adjusting an emission direction of the bundled laser beam;
a field lens; and
a primary lens,
wherein the plurality of laser fibers is configured to each emit a laser beam, which passes through the positioning optics, the field lens and the primary lens such that the laser beam emitted by the transmitter unit is emitted in bundled form,
wherein the transmitter unit is configured such that each laser beam passes through the positioning optics, then the field lens and then the primary lens, in that order,
wherein the receiver unit has a radiant power capture unit, which is configured to receive the bundled laser beam emitted by the transmitter unit and convert the bundled laser beam into electricity, and
wherein the electricity is provided for supplying electricity to a drive of the transport device.

11. The transport device according to claim 10, wherein:
the receiver unit has a retroreflector, which is configured to reflect a positioning beam in the direction of the transmitter unit, and
the positioning beam and a precision stabilization unit comprising a coaxial high-speed camera and an adaptive optical plate are designed as correction elements to perform a high-precision orientation of the transmitter unit in the direction of the receiver unit, so that the bundled laser beam is emitted onto a predefined receiving area of the receiver unit.

12. The transport devices according to claim 10, further comprising:
a transparent housing to hold the receiver unit,
wherein the receiver unit is suspended by Cardan suspension in the transparent housing.

13. The transport devices according to claim 10, further comprising:
   a rechargeable battery, which is designed to be charged by the power received by the receiver unit,
   wherein the battery is designed to supply electricity for supplying power to the drive of the transport device when the power already supplied by the receiver unit falls below a predefined level.

14. The transport devices according to claim 10, wherein the transport device is an aircraft.

15. The transport devices according to claim 11, wherein the receiving area is circular and has a diameter of max. 0.5 m.

16. The transport devices according to claim 15, further comprising:
   a transparent housing to hold the receiver unit,
   wherein the receiver unit is suspended by Cardan suspension in the transparent housing.

17. The transport devices according to claim 12, wherein the transparent housing can be acted upon by an excess pressure in comparison with atmospheric pressure prevailing outside of the transparent housing.

18. The transport devices according to claim 13, further comprising:
   a solar generator on a top side, which is designed to generate electricity for operation and for storage in the battery.

* * * * *